(12) United States Patent
Ovshinsky et al.

(10) Patent No.: US 6,627,340 B1
(45) Date of Patent: *Sep. 30, 2003

(54) FUEL CELL HYDROGEN SUPPLY SYSTEMS USING SECONDARY FUEL TO RELEASE STORED HYDROGEN

(75) Inventors: Stanford R. Ovshinsky, Bloomfield Hills, MI (US); Rosa T. Young, Bloomfield Hills, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/687,718

(22) Filed: Oct. 13, 2000

Related U.S. Application Data

(63) Continuation-in-part of application No. 09/609,487, filed on Jul. 5, 2000, now Pat. No. 6,491,866, which is a continuation-in-part of application No. 09/435,497, filed on Nov. 6, 1999, now Pat. No. 6,193,929.

(51) Int. Cl.$^7$ .......................... C22C 23/00; H01M 8/18; B60L 11/18
(52) U.S. Cl. .......................... 429/20; 420/900; 420/402; 180/65.3
(58) Field of Search .................... 429/19, 20, 59; 180/65.3; 420/900, 402, 407; 423/658.2, 648.1

(56) References Cited

U.S. PATENT DOCUMENTS

| | | | | |
|---|---|---|---|---|
| 4,302,217 A | * | 11/1981 | Teitel | 48/180 |
| 4,385,726 A | * | 5/1983 | Bernauer et al. | 237/12.3 |
| 4,570,446 A | * | 2/1986 | Matsubara et al. | 62/48 |
| 5,360,461 A | * | 11/1994 | Meinzer | 48/61 |
| 5,512,145 A | * | 4/1996 | Hollenberg | 205/628 |
| 5,527,632 A | * | 6/1996 | Gardner | 429/27 |
| 5,634,341 A | * | 6/1997 | Klanchar et al. | 60/673 |
| 5,964,965 A | * | 10/1999 | Schulz et al. | 148/420 |
| 6,193,929 B1 | * | 2/2001 | Ovshinsky et al. | 420/402 |
| 6,267,229 B1 | * | 7/2001 | Heung | 206/0.7 |
| 6,268,075 B1 | * | 7/2001 | Autenrieth et al. | 429/17 |
| 6,277,509 B1 | * | 8/2001 | Wheeler | 429/17 |
| 6,294,276 B1 | * | 9/2001 | Ogino | 429/17 |
| 6,306,531 B1 | * | 10/2001 | Clingerman et al. | 429/19 |
| 6,346,340 B1 | * | 2/2002 | Abersfelder et al. | 429/12 |
| 6,368,735 B1 | * | 4/2002 | Lomax et al. | 429/17 |

OTHER PUBLICATIONS

US pat application Publication No. 2001/0053472 A1, 12/01, Edlund, David.*

* cited by examiner

Primary Examiner—George Wyszomierski
Assistant Examiner—Janelle Combs Morillo
(74) Attorney, Agent, or Firm—David W. Schumaker; Frederick W. Mau, II; Marvin S. Siskind

(57) ABSTRACT

Hydrogen propelled fuel cell vehicle system designs that reduce the relative cost of releasing hydrogen from hydrogen storage alloys by providing and/or utilizing secondary sources of heat to supply the heat of desorption of stored hydrogen. The secondary source can include combusting conventional secondary (non-hydrogen) fuels. The fuel supply system uses fundamentally new magnesium-based hydrogen storage alloy materials which for the first time make it feasible and practical to use solid state storage and delivery of hydrogen to power fuel cell vehicles. These exceptional alloys have remarkable hydrogen storage capacity of over 7 weight % coupled with extraordinary absorption kinetics such that the alloy powder absorbs 80% of its total capacity within 1.5 minutes at 300° C. and a cycle life of at least 2000 cycles without loss of capacity or kinetics.

23 Claims, 7 Drawing Sheets

FUEL CELL HYDROGEN SUPPLY SYSTEMS USING SECONDARY FUEL TO RELEASE STORED HYDROGEN

RELATED APPLICATIONS

The instant application is a continuation-in-part of U.S. application Ser. No. 09/609,487 filed Jul. 5, 2000 now U.S. Pat. No. 6,491,866, (which is, in turn, a continuation-in-part of U.S. application Ser. No. 09/435,497, filed Nov. 6, 1999 now U.S. Pat. No. 6,193,929.

FIELD OF THE INVENTION

The instant invention relates generally to system designs and thermal considerations that allow the use of revolutionary new Ovonic hydrogen storage alloys as the fuel supply source for fuel cells. More specifically the instant invention relates to system designs that reduce the relative cost of releasing hydrogen from hydrogen storage alloys by combusting conventional fuels or exploiting other forms of waste heat to provide the heat of desorption for the hydrogen which ultimately powers the fuel cell. The hydrogen storage alloys used to store hydrogen in the systems of the instant invention are capable of storing on the order of 7 weight % hydrogen and are capable of absorbing at least 80% of their maximum capacity in 1.5 minutes and have a cycle life of at least 2000 cycles without loss of capacity or kinetics.

BACKGROUND OF THE INVENTION

The instant patent application describes system designs and thermal considerations for the economical use of hydrogen storage alloys, useful for a hydrogen-based economy. With the systems described herein, it is realistic to have automobiles which have a 300 mile range on a single fill-up of hydrogen, by burning hydrogen directly and recovering the waste heat to reduce the amount of additional heat require to release the stored hydrogen. The elements and interactive local environments of alloys, which are disclosed in U.S. Pat. No. 6,491,866 filed Jul. 5, 2000 (the '866 patent, hereby incorporated by reference) provide them with high storage capacity, excellent kinetics and long cycle life. An infrastructure system for such a hydrogen based economy, is the subject of U.S. Pat. No. 6,305,442, entitled "A Hydrogen-based Ecosystem" filed on Nov. 22, 1999 (the '442 patent), which is hereby incorporated by reference. This infrastructure, in turn, is made possible by hydrogen storage alloys that have surmounted the chemical, physical, electronic and catalytic barriers that have heretofore been considered insoluble. Other hydrogen storage alloys which are useful in such an infrastructure are fully described in U.S. Pat. No. 6,193,929, entitled "High Storage Capacity Alloys Enabling a Hydrogen-based Ecosystem", filed on Nov. 6, 1999 ("the '929 patent"), which is hereby incorporated by reference. The '929 patent relates to alloys which solve the unanswered problem of having sufficient hydrogen storage capacity with exceptionally fast kinetics to permit the safe and efficient storage of hydrogen to provide fuel for a hydrogen based economy, such as powering internal combustion engine and fuel cell vehicles. In the '929 patent the inventors for the first time disclosed the production of Mg-based alloys having both hydrogen storage capacities higher than about 6 wt. % and extraordinary kinetics. This revolutionary breakthrough was made possible by considering the materials as a system and thereby utilizing chemical modifiers and the principles of disorder and local order, pioneered by Stanford R. Ovshinsky, in such a way as to provide the necessary catalytic local environments, and at the same time designing bulk characteristics for storage and high rate charge/discharge cycling. In other words, these principles allowed for tailoring of the material by controlling the particle and grain size, topology, surface states, catalytic activity, microstructure, and total interactive environments for extraordinary storage capacity. Wherein disorder provides extra degrees of freedom so that atomic engineering can be applied, e.g. new compositions that have compositional, positional, and topological disorder. The function of a site can be altered and controlled by changing it's composition, position, and interaction with adjacent elements. This can be accomplished by using specific elements, modifying the number of sites, using the addition of chemical modifiers and adding/removing elements on an atomic scale to create atomic scale porosity.

The combination of the '442 and the '929 patents solves the twin basic barriers which have held back the ubiquitous use of hydrogen: 1) storage capacity; and 2) infrastructure. With the use of the alloys of the '929 patent, hydrogen can be shipped safely by boats, barges, trains, trucks, etc. when in solid form. The hydrogen infrastructure described in the '442 patent requires careful thermal management and efficient heat utilization throughout the entire system. The instant invention helps to make the necessary heat transfer between the subsystems of the infrastructure simple, efficient, and economical, by reducing the additional outside heat necessary to release the hydrogen without actually burning or combusting the hydrogen itself.

As the world's population expands, and its economy increases, the atmospheric concentrations of carbon dioxide are warming the earth causing climate change. The global energy system is moving steadily away from the carbon-rich fuels whose combustion produces the harmful gas. For nearly a century and a half, starting withe the industrial revolution, fuels with high amounts of carbon have progressively been replaced by those containing less. It had been predicted that this evolution will produce a carbon-free energy system by the end of the $21^{st}$ century. The instant invention is a means of combusting small amounts of hydrocarbon fuels to help use a carbon free energy source that will provide vehicles with a 300 mile range. In the near term, hydrogen will be used in fuel cells for cars, trucks and industrial plants, just as it already provides power for orbiting spacecraft. Hydrogen is already the fuel source used in batteries (such as the hydride batteries developed by Ovonic Battery Company which shuttle hydrogen back and forth to generate electricity, and have revolutionized the auto industry), and fuel cells use hydrogen to generate electricity. With the advent of high capacity, fast kinetics solid state storage materials, hydrogen now will provide a general carbon-free fuel to cover all fuel needs.

FIG. 1, taken from reliable industrial sources, is a graph demonstrating society's move toward a carbon-free environment as a function of time starting with the use of wood in the early 1800s, going simultaneously through the industrial revolution, and ending in about 2010 with the beginning of a "hydrogen" economy. In the 1800s, fuel was primarily wood in which the ratio of hydrogen to carbon was about 0.1. As society switched to the use of coal and oil, the ratio of hydrogen to carbon increased first to 1.3 and then to 2 and more recently to 4. However, the ultimate goal for society is to employ a carbon-free fuel, i.e., the most ubiquitous of elements, pure hydrogen. The problem has been that liquid or gaseous storage cant be safely and economically used. Solid state storage capacity and infrastructure will solve these problems. The inventors of the '929 and the '442 patents have made this possible by inventing a 7% storage material (7% is an un-optimized figure and will be increased along with better kinetics) with exceptional absorption/desorption kinetics, i.e. at least 80% charge in less than 2 minutes and an infrastructure to use these storage alloys. These alloys, following the principles of atomic engineering, allow for the first time, a safe, high capacity means of storing, transporting and delivering pure hydrogen. They allow for shipment of hydrogen in ordinary cargo containers without the strict regulations and restrictions of normal hydrogen transportation.

Hydrogen is the "ultimate fuel." It is inexhaustible. Hydrogen is the most plentiful element in the universe and all matter contains hydrogen. Hydrogen can provide a clean source of energy for our planet and can be produced by various processes which split water into hydrogen and oxygen. The hydrogen can then be stored and transported in solid state form, therefore being economically and safely used.

While the world's oil reserves are depletable; the supply of hydrogen remains virtually unlimited. Hydrogen, which can be produced from coal, natural gas and other hydrocarbons, is preferably formed via electrolysis of water, more preferably using energy from the sun (see U.S. Pat. No. 4,678,679 ('679), the disclosure of which is incorporated herein by reference.) It should be noted that the triple-junction solar cells disclosed in the '679 patent are particularly suited to electrolysis of water, because their output voltage is exactly the voltage needed for the eletrolysis, and thus, no voltage modifying electronics are needed to perform the electrolysis. However, hydrogen can also be produced by the electrolysis of water using any other form of economical energy (e.g., wind, waves, geothermal, hydroelectric, nuclear, etc.) Furthermore, hydrogen, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependancy on oil, etc., as well as providing a means of helping developing nations.

While hydrogen has wide potential application as a fuel, a major drawback in its utilization, especially in mobile uses such as the powering of vehicles, has been the lack of an acceptable lightweight hydrogen storage medium. Storage of hydrogen as a compressed gas involves the use of large and heavy vessels. Additionally, large and very expensive compressors are required to store hydrogen as a compressed gas and compressed hydrogen gas is a very great explosion/fire hazzard.

Hydrogen also can be stored as a liquid. Storage as a liquid, however, presents a serious safety problem when used as a fuel for motor vehicles since hydrogen is extremely flammable. Liquid hydrogen also must be kept extremely cold, below −253 ° C., and is highly volatile if spilled. Moreover, liquid hydrogen is expensive to produce and the energy necessary for the liquefaction process is a major fraction of the energy that can be generated by burning the hydrogen. Another drawback to storage as a liquid is the costly losses of hydrogen due to evaporation, which can be very high.

For the first time, storage of hydrogen as a solid hydride, using the atomically engineered alloys of the '929 patent can provide a greater percent weight storage than storage as a compressed gas or a liquid in pressure tanks. Also, hydrogen storage in a solid hydride is safe and does not present any of the hazard problems that hydrogen stored in containers as a gas or a liquid does, because hydrogen, when stored in a solid hydride form, exists in it's lowest free energy state.

In addition to the problems associated with storage of gaseous or liquid hydrogen, there are also problems associated with the transport of hydrogen in such forms. For instance transport of liquid hydrogen will require super-insulated tanks, which will be heavy and bulky and will be susceptible to rupturing and explosion. Also, a portion of the liquid hydrogen will be required to remain in the tanks at all times to avoid heating-up and cooling down of the tank which would incur big thermal losses. As for gaseous hydrogen transportation, pressurized tankers could be used for smaller quantities of hydrogen, but these too will be susceptible to rupturing and explosion. For larger quantities, a whole new hydrogen pipeline transportation system would need to be constructed or the compressor stations, valves and gaskets of the existing pipeline systems for natural gas will have to be adapted and retrofitted to hydrogen use. This assumes, of course, that the construction material of these existing pipelines will be suited to hydrogen transportation.

A high hydrogen storage capacity per unit weight of material is an important consideration in applications where the hydride does not remain stationary. A low hydrogen storage capacity relative to the weight of the material reduces the mileage and hence the range of the vehicle making the use of such materials impractical. A low desorption temperature (in the neighborhood of 300° C.) is desirable to reduce the amount of energy required to release the hydrogen. Furthermore, a relatively low desorption temperature to release the stored hydrogen is necessary for efficient utilization of the available exhaust heat from vehicles, machinery, or other similar equipment.

Good reversibility is needed to enable the hydrogen storage material to be capable of repeated absorption-desorption cycles without significant loss of its hydrogen storage capabilities. Good kinetics are necessary to enable hydrogen to be absorbed or desorbed in a relatively short period of time. Resistance to poisons to which the material may be subjected during manufacturing and utilization is required to prevent a degradation of acceptable performance.

The prior art metallic host hydrogen storage materials include magnesium, magnesium nickel, vanadium, iron-titanium, lanthanum pentanickel and alloys of these metals others. No prior art material, however, has solved the aforementioned problem which would make it suitable for a storage medium with widespread commercial utilization which can revolutionize the propulsion industry and make hydrogen a ubiquitous fuel.

Thus, while many metal hydride systems have been proposed, the Mg systems have been heavily studied since elemental Mg can store over 7 weight % of hydrogen. While magnesium can store large amounts of hydrogen, prior to our work (using d & f orbital elemental modification, causing new bonding options with local environments), it has had the disadvantage of extremely slow kinetics. For example, magnesium hydride is theoretically capable of storing hydrogen at approximately 7.6% by weight computed using the formula: percent storage=H/H+M, where H is the weight of the hydrogen stored and M is the weight of the material to store the hydrogen (all storage percentages hereinafter referred to are computed based on this formula). Unfortunately, despite high storage capacity, prior art materials were useless because discharge of the hydrogen took days. While a 7.6% storage capacity is ideally suited for on board hydrogen storage for use in powering vehicles, it requires the instant invention to form Mg-based alloys operating on principles of disorder to alter previously unuseable materials and make them commercially acceptable for widespread use.

Magnesium is very difficult to activate. For example, U.S. Pat. No. 3,479,165 discloses that it is necessary to activate magnesium to eliminate surface barriers at temperatures of 400° C. to 425° C. and 1000 psi for several days to obtain a reasonable (90%) conversion to the hydride state. Furthermore, desorption of such hydrides typically requires heating to relatively high temperatures before hydrogen desorption begins. The aforementioned patent states that the $MgH_2$ material must be heated to a temperature of 277° C. before desorption initiates, and significantly higher temperatures and times are required to reach an acceptable operating output. Even then, the kinetics of pure Mg are unacceptable, i.e., unuseable. The high desorption temperature makes the prior art magnesium hydride unsuitable.

Mg-based alloys have been considered for hydrogen storage also. The two main Mg alloy crystal structures investigated have been the $A_2B$ and $AB_2$ alloy systems. In the $A_2B$ system, $Mg_2Ni$ alloys have been heavily studied because of their moderate hydrogen storage capacity, and lower heat of formation ('64 kJ/mol)than Mg. However, because $Mg_2Ni$ has the possibility of a storage capacity of up to 3.6 wt. % hydrogen, researchers have attempted to improve the hydrogenation properties of these alloys through mechanical alloying, mechanical grinding and elemental substitutions. However, 3.6 wt. % is not nearly high enough and the kinetics are likewise insufficient.

More recently, investigators have attempted to form $MgNi_2$ type alloys for use in hydrogen storage. See Tsushio et al, Hydrogenation Properties of Mg-based Laves Phase Alloys, *Journal of Alloys and Compounds*, 269 (1998), 219–223. Tsushi et al. determined that no hydrides of these alloys have been reported, and they did not succeed in modifying $MgNi_2$ alloys to form hydrogen storage materials.

Finally, the instant inventors have worked on high Mg content alloys or elementally modified Mg. For instance, in U.S. Pat. Nos. 5,976,276; 5,916,381; and 6,103,024, Sapru, et al have produced mechanically alloyed Mg—Ni—Mo and Mg—Fe—Ti materials containing about 75 to 95 atomic percent Mg, for thermal storage of hydrogen. These alloys are formed by mixing the elemental ingredients in the proper proportions in a ball mill or attritor and mechanically alloying the materials for a number of hours to provide the mechanical alloy. While these alloys have improved storage capacities as compared with $Mg_2Ni$ alloys, they have lower plateau pressures than are acceptable.

Another example of modified high Mg content alloy is disclosed in U.S. Pat. No. 4,431,561 ('561) to Ovshinsky et al., the disclosure of which is hereby incorporated by reference. In the '561 patent, thin films of high Mg content hydrogen storage alloys were produced by sputtering. While this work was remarkable in applying fundamental principles to drastically improve the storage capacities, it was not until the invention described herein that all necessary properties of high storage capacity, good kinetics and good cycle life were brought together.

In U.S. Pat. No. 4,623,597 ("the '597 patent"), the disclosure of which is incorporated by reference, one of the present inventors, Ovshinsky, described disordered multicomponent hydrogen storage materials for use as negative electrodes in electrochemical cells for the first time. In this patent, Ovshinsky describes how disordered materials can be tailor-made to greatly increase hydrogen storage and reversibility characteristics. Such disordered materials are formed of one or more of amorphous, microcrystalline, intermediate range order, or polycrystalline (lacking long range compositional order) wherein the polycrystalline material may include one or more of topological, compositional, translational, and positional modification and disorder, which can be designed into the material. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed such Ovonic batteries to be utilized most advantageously as secondary batteries, but also as primary batteries and are used today worldwide under license from the assignee of the subject invention.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. The disordered material had the desired electronic configurations which resulted in a large number of active sites. The nature and number of storage sites was designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods therebetween resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of catalytically active sites for hydrogen dissociation and also of hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The disorder described in the '597 patent can be of an atomic nature in the form of compositional or configurational disorder provided throughout the bulk of the material or in numerous regions of the material. The disorder also can be introduced into the host matrix or on the surface by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces which are rich in local chemical environments which provide numerous desirable sites for electrochemical hydrogen storage.

Certain differences between chemical and thermal hydrides are fundamental. The thermal hydride alloys of the present inventions have been designed as a distinct class of materials with their own basic problems to be solved, which problems as shown in the following Table 1 are antithetical to those to be solved for electrochemical systems.

During utilization of the hydrogen stored in these aforementioned hydrogen storage alloys, heat is required to release the hydrogen from the alloys. There are a number of ways in which this heat can be provided. For example, when the hydrogen is to be supplied to an internal combustion engine, the heat can come from the exhaust of the engine itself. However, when the hydrogen is to be supplied to a fuel cell, it is difficult to use that exhaust heat to release the stored hydrogen from the storage bed. Thus, another source of heat is needed.

While hydrogen itself can be burned or catalytically combusted to provide the necessary heat, this reduces the hydrogen available to the fuel cell, thus increasing the weight and volume of the storage bed required to supply a fixed mass of hydrogen to the fuel cell. For instance, in a typical fuel cell vehicle, some of the stored hydrogen may be needed to provide the heat necessary to release all of the stored hydrogen and heat up the surrounding components (i.e. casings, heat transfer components, etc.). Obviously it is necessary to minimize this loss of available hydrogen.

Thus, there is a strong felt need in the art for a system which provides the required heat to release the stored hydrogen without burning hydrogen. Such a system is described hereinafter.

TABLE 1

|  | Electrochemical Hydrogen Storage Material | Gas Phase (Thermal) Hydrogen Storage Material |
|---|---|---|
| Mechanism | $H_2O$ molecule splits | $H_2$ dissociates at the material surface |
| Environment | Alkaline oxidizing environment (KOH electrolyte) | $H_2$ gas - very susceptible to poisoning by oxygen (inoperative in presence of KOH) |
| Kinetics | Hydrogen storage/release at room temperature | Hydrogen storage anywhere from 20° C. to 100° C. |
| Thermodynamics | Specific range of useful M—H bond strength | M—H bond strength of varying degrees is preferred |

TABLE 1-continued

|  | Electrochemical Hydrogen Storage Material | Gas Phase (Thermal) Hydrogen Storage Material |
|---|---|---|
| Thermal Conductivity | Small effect | Large effect |
| Electrical Conductivity | Large effect | Small effect |
| Chemical Reaction | $M + H_2O + e^- \rightleftarrows MH + OH^-$ | $H_2(g) \rightleftarrows 2H$ |

SUMMARY OF THE INVENTION

The instant invention provides system designs that reduce the relative cost of releasing hydrogen from hydrogen storage alloys by combusting conventional fuels to provide the heat of desorption. The system includes means to store the conventional fuel; a means to combust the conventional fuel, and a means to provide the heat produced by combusting the conventional fuel to the storage bed for release of the stored hydrogen.

The alloys used to store the hydrogen are high capacity, low cost, light weight thermal hydrogen storage alloy materials having fast kinetics in the form of a magnesium based hydrogen storage alloy powder. These alloys, for the first time make it feasible to use solid state storage and delivery of hydrogen to power a hydrogen based economy, and particularly to power mobile energy consumer applications such as internal combustion engine or fuel cell vehicles. The alloy contains greater than about 90 weight % magnesium and has a) a hydrogen storage capacity of at least 6 weight %; b) absorption kinetics such that the alloy powder absorbs 80% of it's total capacity within 10 minutes at 300° C.; c) a cycle life of at least 500 cycles without loss of capacity or kinetics. More preferably the alloy powder has a hydrogen storage capacity of at least 6.5 weight % and most preferably at least 6.9 weight % and yet more preferentially 7 wt %. Also, the alloy powder more preferably absorbs 80% of it's total capacity within 5 minutes at 300° C. and most preferably within 1.5 minutes. The material preferably cycles at least 650 times, more preferably at least 1000 times, and most preferentially at least 2000 times without loss of kinetics or capacity.

Modifier elements added to the magnesium to produce the alloys mainly include Ni and Mm (misch metal) and can also include additional elements such as Al, Y and Si, as well as modifier elements such as carbon and boron which are light weight, absorb hydrogen, and change the local active environment. Boron allows for the acceptance of two electrons which changes the number of available electrons for forming hybridized hydrogen storage sites. A hybridized hydrogen storage site is where hydrogen is surrounded by a few electrons, but not a normal lattice storage site. Thus the alloys will typically contain 0.5–2.5 weight % nickel and about 1.0–4.0 weight % Mm (predominantly contains Ce and La and Pr). The alloy may also contain one or more of 3–7 weight % Al, 0.1–1.5 weight % Y and 0.3–1.5 weight % silicon.

DETAILED DESCRIPTION OF THE INVENTION

Figure 1:
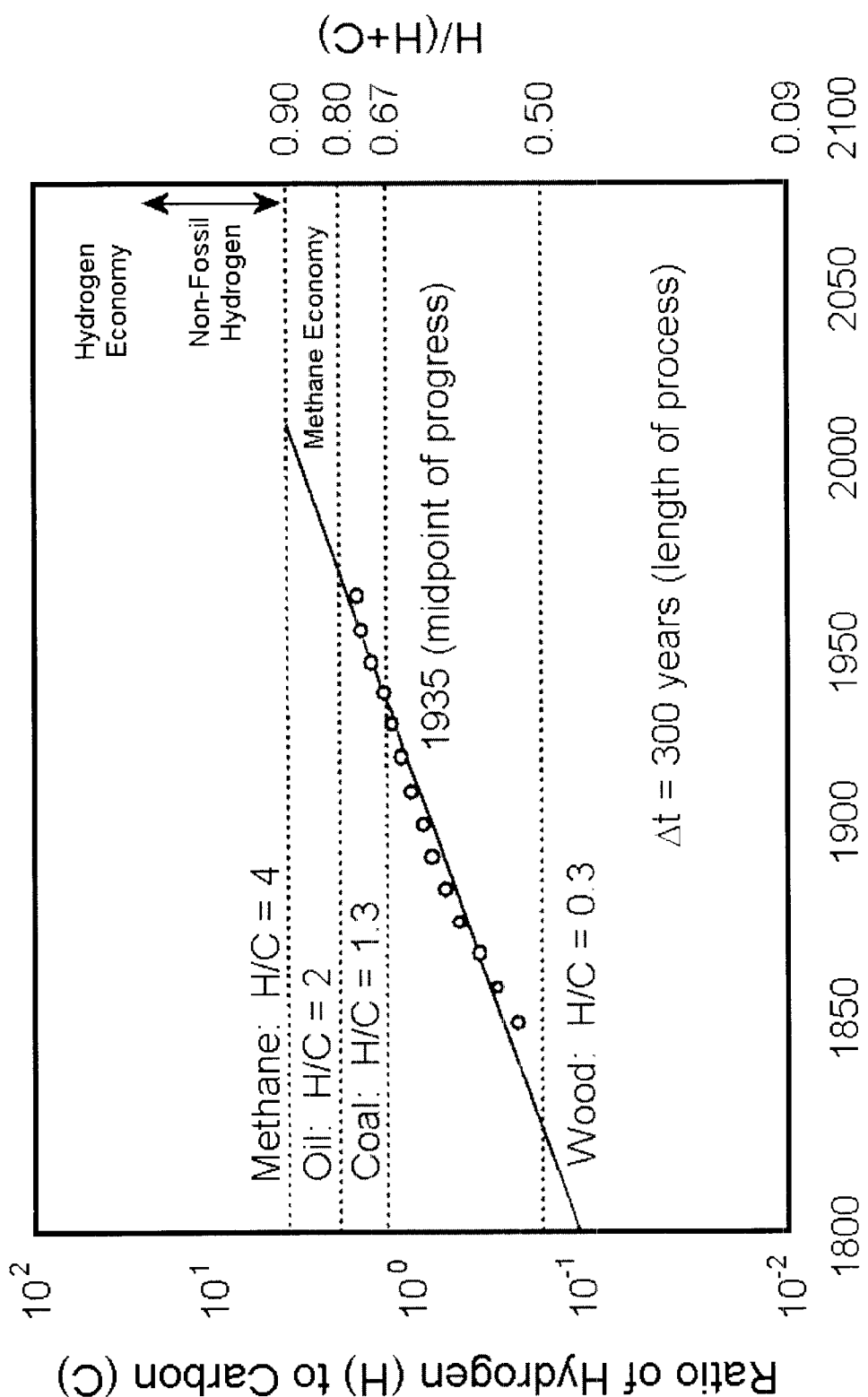
FIG. 1 is a graph having time plotted on the abscissa and the H/C ratio plotted on the ordinate, said graph demonstrating the movement of society toward carbon-free sources of fuel.
Figure 2:
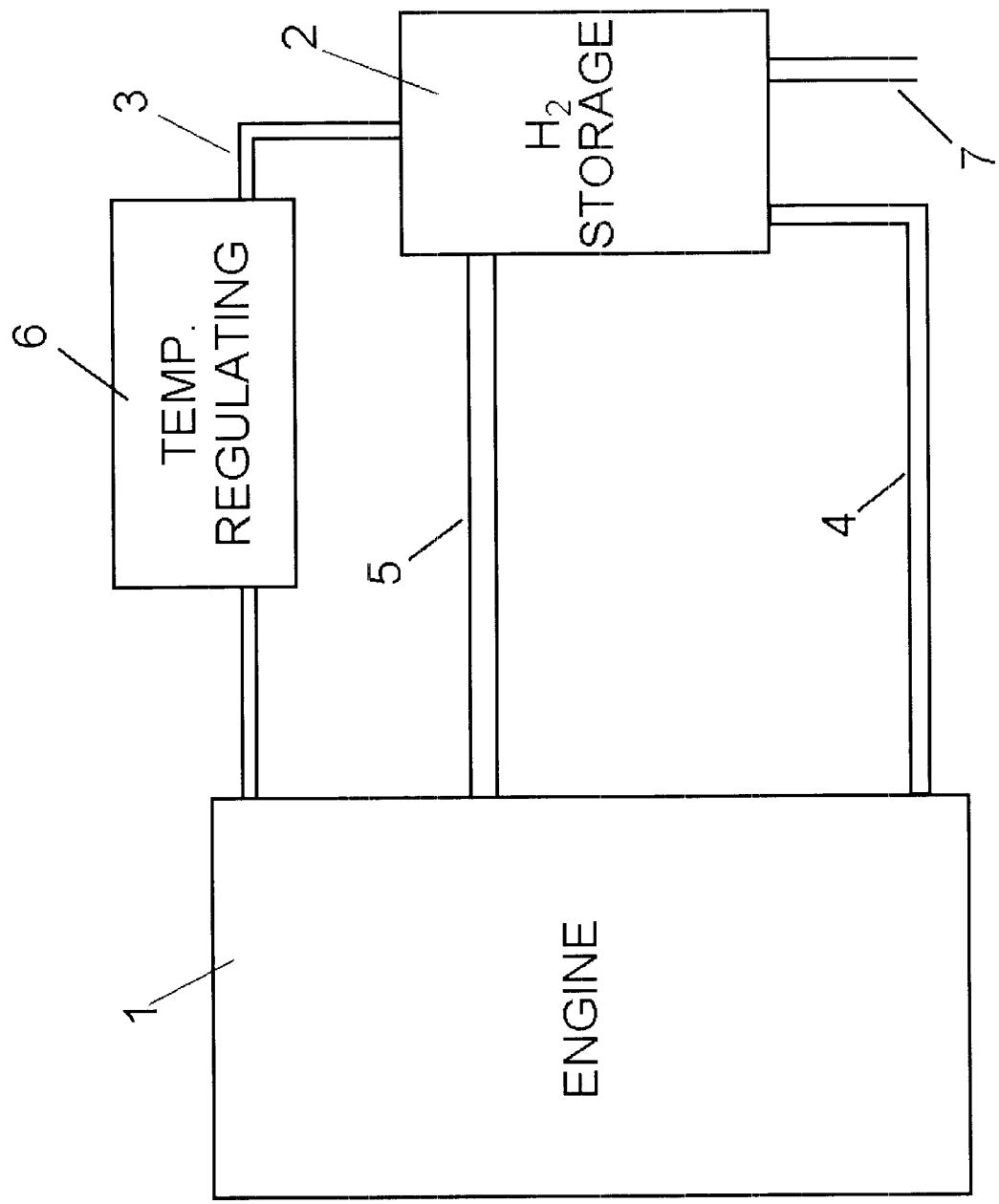
FIG. 2, shows a schematic representation of a hydrogen gas supply system which utilizes the alloy of the instant invention for powering an internal combustion engine vehicle.

As mentioned above, when a hydrogen storage alloy bed is used as the source of fuel for an internal combustion engine, the excess heat from the engine exhaust can be used to heat the hydrogen storage bed to release more hydrogen. FIG. 2 is a schematic diagram of such a system. The system depicts a hydrogen gas supply system for an ICE vehicle. The supply system supplies a hydrogen engine 1 with hydrogen gas. The system has a hydrogen gas storage portion 2 and an engine waste heat transfer supply passage 3 which leads engine waste heat (in the form of exhaust gas or engine coolant) discharged from the engine 1 to the hydrogen gas storage portion 2. The system also includes a return passage 4 for returning any engine coolant used to heat the hydrogen storage material back to the engine 1 and an exhaust gas vent 7 for releasing used exhaust gas. The system further includes a hydrogen gas supply passage 5 which leads hydrogen gas from the hydrogen gas storage portion 2 to the engine 1. The engine waste heat transfer supply passage 3 is provided with a temperature regulating portion 6 which regulates the temperature of the waste heat to be introduced into the hydrogen gas storage portion 2. With such a system, waste heat generated within the ICE can be efficiently used to heat the hydrogen storage material to release hydrogen therefrom for use in the ICE.

Figure 3:
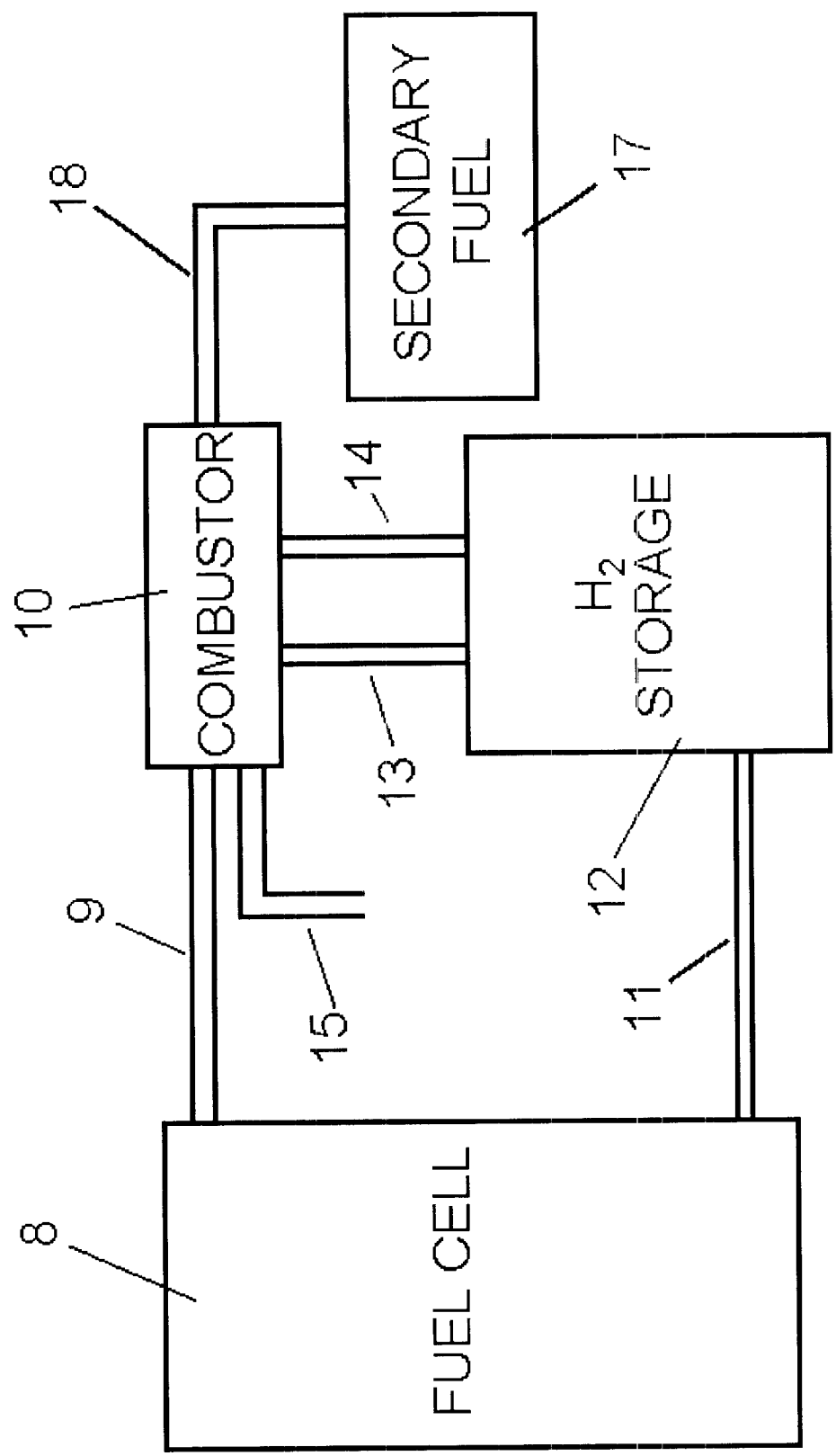
FIG. 3, shows a schematic representation of a hydrogen gas supply system which utilizes the alloy of the instant invention for powering for a fuel cell vehicle.

As discussed above, when such a fuel supply system is used with a fuel cell, very little usable waste heat is available to release the stored hydrogen from the storage bed, and combusting hydrogen is a very uneconomical method of providing the required heat. Therefore, the instant inventors have developed the present system to economically release the stored hydrogen. FIG. 3 shows a schematic representation of a hydrogen gas supply system for a FC vehicle, which is for supplying a fuel cell 8 with hydrogen gas. The system has a hydrogen gas storage portion 12 and a transfer supply passage 9 which leads unused hydrogen discharge from the fuel cell 8 to a fuel combustor 10. The combustor 10 combusts unused hydrogen and secondary fuel to heat a thermal transfer medium which is in turn supplied to the storage bed 12, via supply conduit 13, thus providing the necessary heat to release the stored hydrogen. Once the heat from the thermal transfer medium has been transferred to the hydrogen storage bed, the thermal transfer medium is returned to the combustor 10 via return conduit 14. Hydrogen is supplied to the combustor 10 via unused hydrogen from the fuel cell 8, and a secondary fuel, which is stored in tank 17, is transferred to the combustor via supply conduit 18. The system also includes an exhaust gas vent 15 for releasing used combustor gas. The system further includes a hydrogen gas supply passage 11 which leads hydrogen gas from the hydrogen gas storage unit 12 to the fuel cell 8.

The secondary fuel may be any fuel which is readily available, inexpensive and easily stored. Examples of such a fuel are gasoline, fuel oil, propane, diesel fuel, natural gas, etc. The preferred fuel is propane, and the preferred method of storing the propane is in liquid form. The combustor 10 may be any means that utilizes the secondary fuel to produce the required heat to release the hydrogen. Examples of a combustor include flame based burners, internal combustion engines, catalytic combustors, etc. The preferred combustor is a catalytic combustor. Such a catalytic combustor may be a separate unit, or may be combined with the storage bed for more efficient use of the heat of combustion. Specifically, it is noted that merely two gallons of propane would be needed to release all the stored hydrogen required to travel 300 miles with a typical hydrogen powered fuel cell vehicle. This makes the vehicle a very low emission vehicle.

While the specific description of the present system includes a secondary fuel and a means for combustion of the secondary fuel to generate heat to release the stored hydrogen from it's storage bed, other sources of available waste heat can be used, individually or in combination with the secondary fuel. Other sources can include 1) energy from batteries coupled with electrical heating elements, 2) heated waste water from the fuel cell which is converted to steam, and 3) heat/energy released from braking of the vehicle (such as from the brake linings or regenerative braking).

Alloys which are useful for the storage beds of the instant invention contain greater than about 90 weight % magnesium, and contain at least one modifier element. The at least one modifier element creates a magnesium based alloy which have a cycle life of at least 650 cycles without loss of either kinetics or storage capacity. More preferably the materials have a cycle life of at least 1000 cycles and most preferably they have a cycle life of at least 2000 cycles. The alloys are capable of storing at least 6 weight % hydrogen. More preferably the modified alloys are capable of storing at least 6.5 weight % hydrogen and most preferably the modified alloy stores at least 7 weight % hydrogen. The alloys are also capable of absorbing at least 80% of the full storage capacity of hydrogen in under 10 minutes at 300° C., more preferably within under 5 minutes and most preferably in under 1.5 minutes. The modifier elements mainly include Ni and Mm (misch metal) and can also include additional elements such as Al, Y and Si, as well as modifier elements such as carbon and boron which are light weight, absorb hydrogen, and change the local active environment. Boron allows for the acceptance of two electrons which changes the number of available electrons for forming hybridized hydrogen storage sites. A hybridized hydrogen storage site is where hydrogen is surrounded by a few electrons, but not a normal lattice storage site. Thus the alloys will typically contain 0.5–2.5 weight % nickel and about 1.0–4.0 weight % Mm (predominantly contains Ce and La and Pr). The alloy may also contain one or more of 3–7 weight % Al, 0.1–1.5 weight % Y and 0.3–1.5 weight % silicon.

EXAMPLE

A modified Mg alloy having the designation FC-86 was made which has a composition: 95 wt. % Mg, 2 wt. % Ni and 3.0 wt % Mm. The individual raw alloying elements were mixed in a glove box. The mixture was placed in a graphite crucible and the crucible was placed in a furnace. The crucible had a 2.0 mm boron nitride orifice at the bottom thereof which is plugged by a removable boron nitride rod. The furnace was pumped down to very low pressure and purged three times with argon. The argon pressure withing the furnace was brought up to 1 psi and kept at this pressure as the crucible was heated to 750° C. Once the melt was ready, the boron nitride rod was lifted and argon was injected into the furnace under pressure. The molten alloy flowed out of the graphite crucible through the boron nitride orifice and onto a non-water-cooled, horizontally spinning, copper wheel. The wheel, which spins at about 1400 rpm, solidifies the molten alloy into particles which then bounce off a water-cooled copper cap which covers the spinning wheel, and drop into a stainless steel pan where they gradually cool. Five grams of the solidified alloy flakes were mixed with 100 mg of graphite grinding aid. The mixture was mechanically ground for 3 hours. The ground alloy was then classified by sieving to recover material having a particle size of between 30 and 65 microns. The alloy has a storage capacity of about 7 wt. % hydrogen and absorbs 80% of the maximum capacity in less than 2.3 minutes at a temperature of about 275° C. (and can adsorb 80% in less than 1.5 minutes at higher temperatures). Other details of the alloy properties are presented below.

The alloys of the instant invention are unique in their combination of high storage capacity and excellent absorption/desorption kinetics. The instant inventors have found that a combination of both alloy composition and particle size of the hydrogen storage material have a significant effect on the kinetics. That is, the instant inventors have found that the kinetics of the material (regardless of specific composition) can improve with decreasing particle size, which increases surface states. Also, including carbon particles on the surface of the material increases surface states. This can be achieved by mechanically alloying the powdered alloy materials of the instant invention with carbon materials. Thus the alloy can be made via rapid solidification, and then additional surface states can be added by mechanically grinding and/or alloying. Specifically, the instant inventors have found that materials having a particle size of between about 30 and 70 microns are the most useful. This particle size gives excellent kinetics while still being capable of being manufactured.

Figure 4:
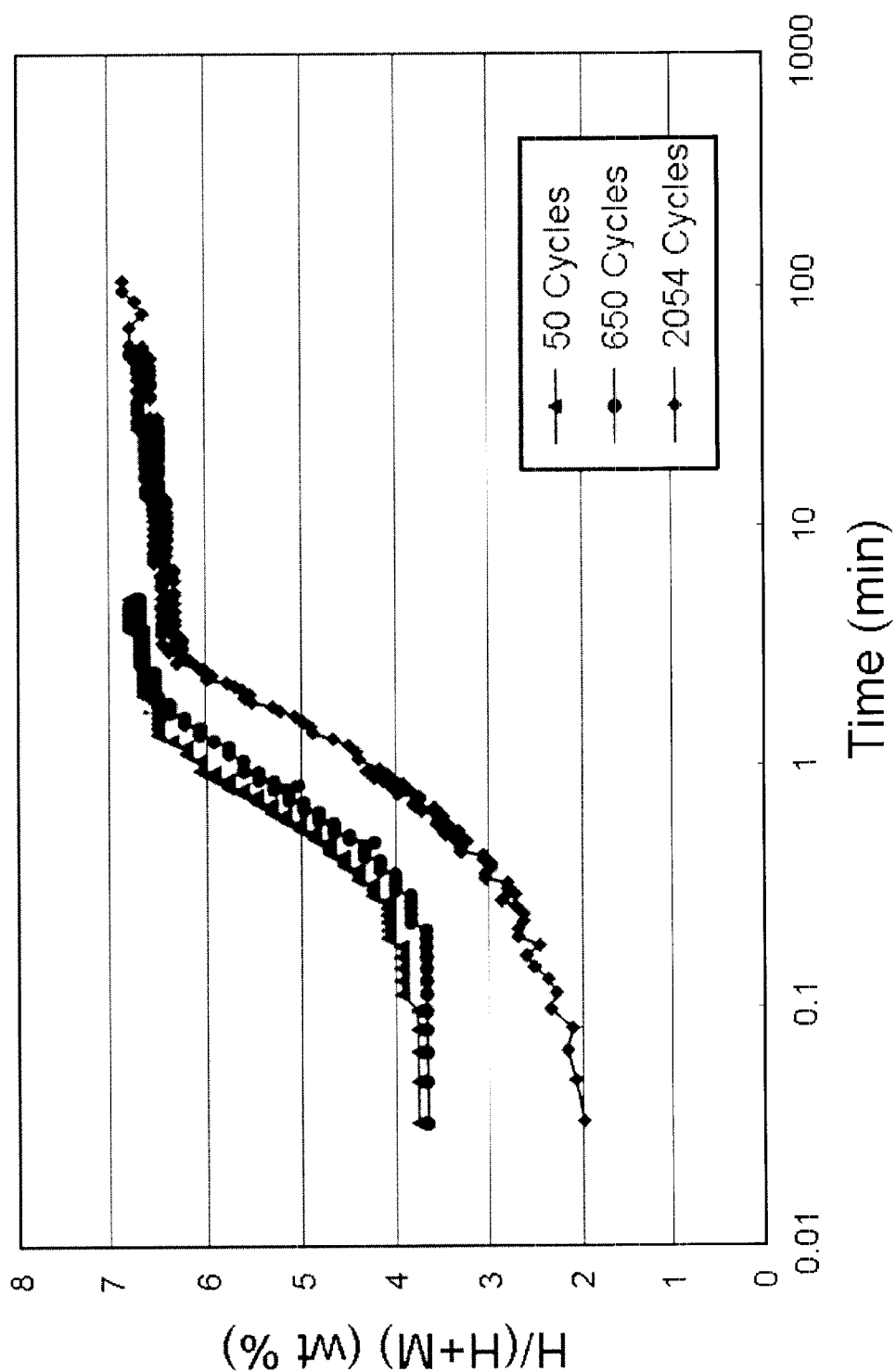
FIG. 4 is an absorption plot of stored hydrogen versus time for an alloy material of the instant invention for cycles 50, 650 and 2054, specifically showing that alloy materials of the instant invention have basically the same hydrogen storage capacity and absorption kinetics at cycle 2054 as they do at cycle 50.

It is significant to note that the kinetics and capacity of the alloys of the instant invention do not degrade with cycling. This can be seen graphically in FIG. 4 which is an absorption plot of stored hydrogen versus time for an alloy material of the instant invention at 300° C. for cycle 50 (represented by the ▲ symbol), cycle 650 (represented by the ● symbol) and cycle 2054 (represented by the ♦ symbol). As shown in FIG. 4, the alloy materials of the instant invention have virtually identical hydrogen storage capacity and absorption kinetics at cycle 2054 as they do at cycle 50. While the present test was terminated at 2054 cycles, all factors indicate that the instant alloys can easily achieve cycle lives of at least 5000 cycles or greater without loss of capacity or kinetics.

Figure 5:
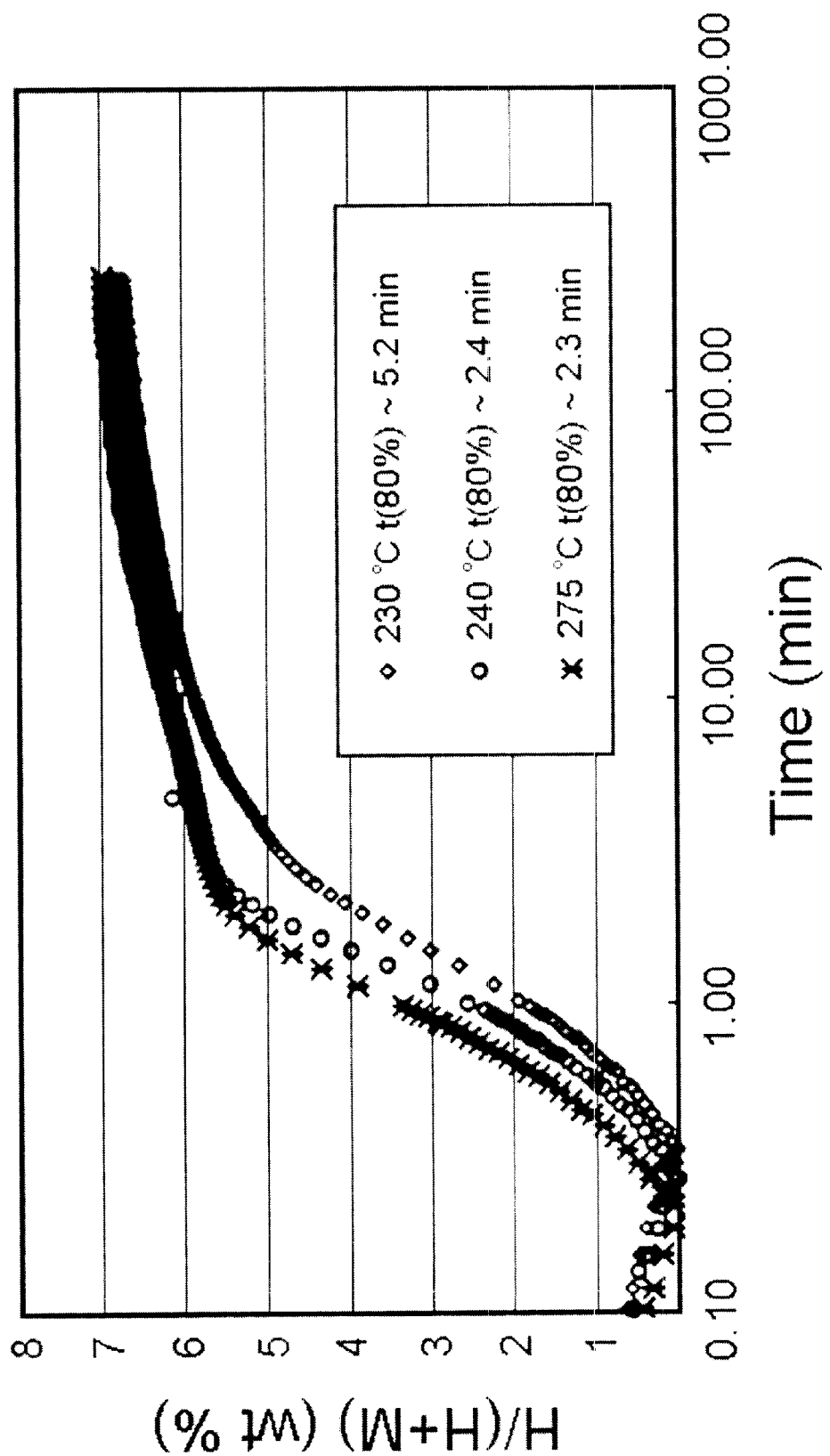
FIG. 5 is a plot of the absorption kinetics of the FC-86 alloy specifically plotted is weight % hydrogen desorption versus time for 3 different temperatures.

FIG. 5 is a plot of the absorption kinetics of the FC-86 alloy. Specifically, weight % hydrogen absorption versus time is plotted for 3 temperatures 230° C. (◇ symbol), 240° C. (○ symbol), and 275° C. (* symbol). As can be seen, at 230° C. the alloy absorbs 80% of it's total capacity in 5.2 minutes, at 300° C. the alloy absorbs 80% of it's total capacity in 2.4 minutes, and at 325° C. the alloy absorbs 80% of it's total capacity in 2.3 minutes.

Figure 6:
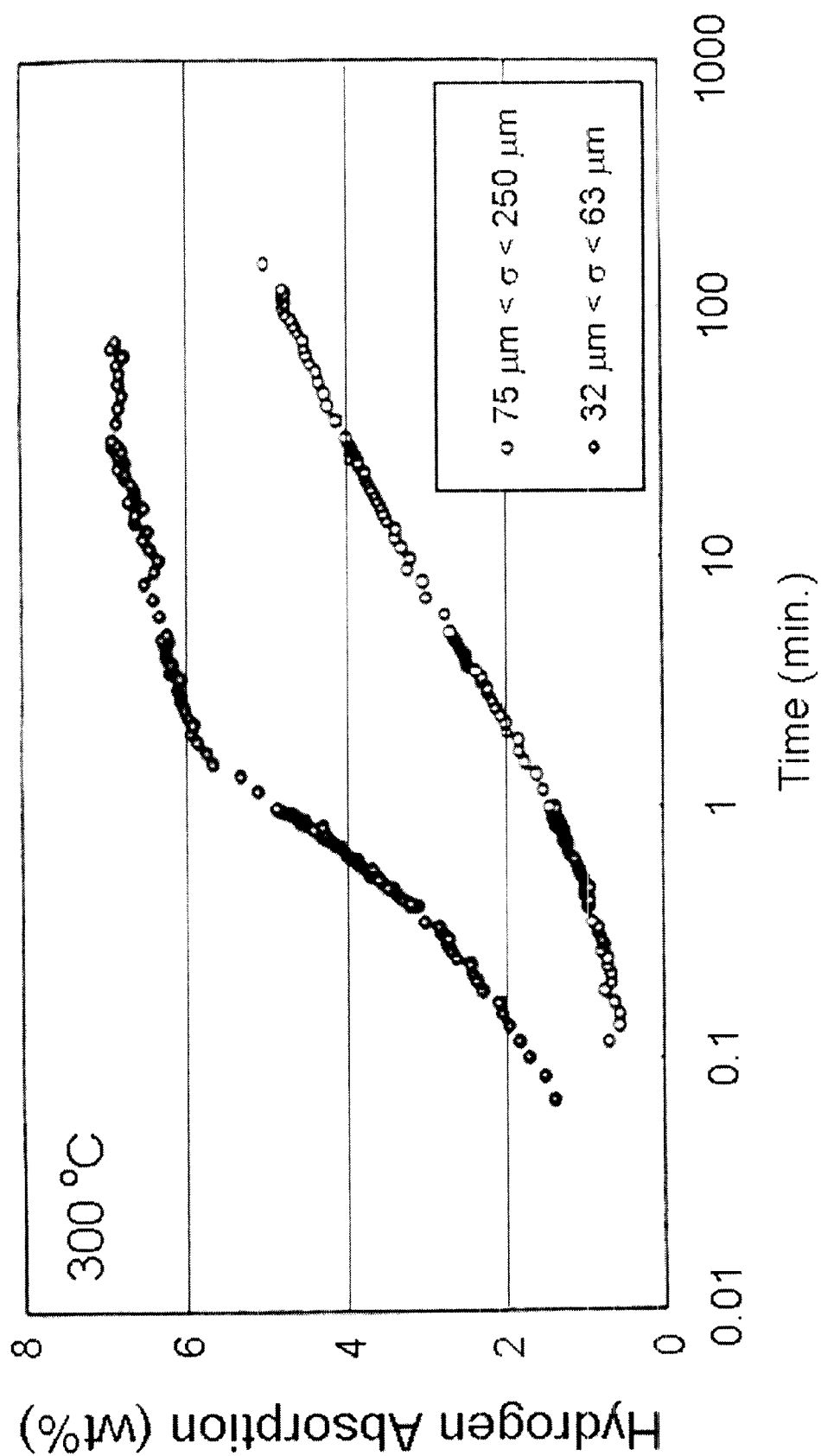
FIG. 6 is a plot of the absorption kinetics of FC-76 alloy powders having two different particle sizes.

FIG. 6 is a plot of the absorption kinetics of alloy material powders of the instant invention having two different particle sizes. Specifically, weight % hydrogen absorption versus time is plotted for material having a particle size range of 75–250 microns (○ symbol), and 32–63 microns (◇ symbol). As can be seen, the smaller particle size greatly enhances the absorption kinetics.

While the method of forming the instant powders in the examples above was rapid solidification and subsequent grinding, gas atomization may also be used. When the materials are ground, use of an attritor is the preferred method of grinding. Particularly useful is the addition of a grinding agent, such as carbon, when grinding these alloys.

The present invention includes a metal hydride hydrogen storage means for storing hydrogen within a container or tank. In one embodiment of the present invention, the storage means comprises a the afore described hydrogen storage alloy material physically bonded to a support means. Generally, the support means can take the form of any structure that can hold the storage alloy material. Examples of support means include, but are not limited to, mesh, grid, matte; foil, foam and plate. Each may exist as either a metal or non-metal.

The support means may be formed from a variety of materials with the appropriate thermodynamic characteristics that can provide the necessary heat transfer mechanism. These include both metals and non-metals. Preferable metals include those from the group consisting of Ni, Al, Cu, Fe and mixtures or alloys thereof. Examples of support means that can be formed from metals include wire mesh, expanded metal and foamed metal.

The hydrogen storage alloy material may be physically bonded to the support means by compaction and/or sintering processes. The alloy material is first converted into a fine powder. The powder is then compacted onto the support means. The compaction process causes the powder to adhere to and become an integral part of the support means. After compaction, the support means that has been impregnated with alloy powder is preheated and then sintered. The preheating process liberates excess moisture and discourages oxidation of the alloy powder. Sintering is carried out in a high temperature, substantially inert atmosphere containing hydrogen. The temperature is sufficiently high to promote particle-to-particle bonding of the alloy material as well as the bonding of the alloy material to the support means.

Figure 7:
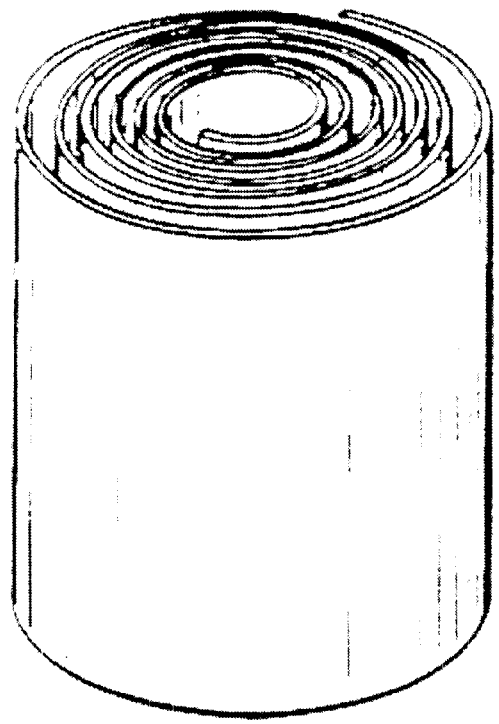
FIG. 7 shows an embodiment of the instant invention where a support means bonded with the hydrogen storage alloy material is spirally wound into a coil.
Figure 8:
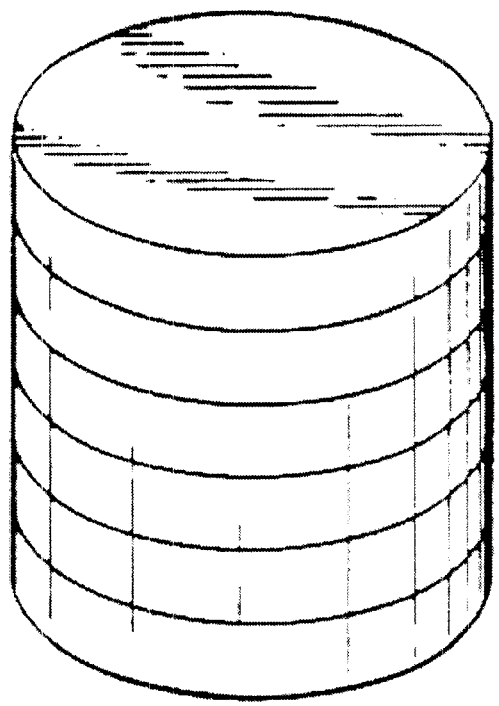
FIG. 8 shows an alternate embodiment of the instant invention where a support means bonded with the hydrogen storage alloy material is assembled as a plurality of stacked disks.

The support means/alloy material can be packaged within the container/tank in many different configurations. FIG. 7 shows a configuration where the support means/alloy material is spirally wound into a coil. FIG. 8 shows an alternate configuration where the support means/alloy material is assembled in the container as a plurality of stacked disks. Other configurations are also possible (e.g. stacked plates).

Compacting and sintering alloy material onto a support means increases the packing density of the alloy material, thereby improving the thermodynamic and kinetic characteristics of the hydrogen storage system. The close contact between the support means and the alloy material improves the efficiency of the heat transfer into and out of the hydrogen storage alloy material as hydrogen is absorbed and desorbed. In addition, the uniform distribution of the support means throughout the interior of the container provides for an even temperature and heat distribution throughout the bed of alloy material. This results in a more uniform rates of hydrogen absorption and desorption throughout the entirety thereof, thus creating a more efficient energy storage system.

One problem when using just alloy powder (without a support means) in hydrogen storage beds is that of of self-compaction due to particle size reduction. That is, during repeated hydriding and dehydriding cycles, the alloy materials expand and contract as they absorb and desorb hydrogen. Some alloy materials have been found to expand and contract by as much as 25% in volume as a result of hydrogen introduction into and release from the material lattice. As a result of the dimensional change in the alloy materials, they crack, undergo fracturing and break up into finer and finer particles. After repeated cycling, the fine particles self-compact causing inefficient hydrogen transfer as well as high stresses that are directed against the walls of the storage container.

However, the processes used to attach the alloy material onto the support means keeps the alloy particles firmly bonded to each other as well as to the support means during the absorption and desorption cycling. Furthermore, the tight packaging of the support means within the container serves as a mechanical support that keeps the alloy particles in place during the expansion, contraction and fracturing of the material.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A hydrogen powered vehicle system, said system including:
    a fuel cell;
    a hydrogen supply means operatively interconnected to said fuel cell, said hydrogen supply means including a hydrogen storage bed; and
    a source of heat for releasing stored hydrogen from said storage bed;
    said hydrogen storage bed containing a hydrogen storage alloy which is characterized in that said alloy has:
    a) a hydrogen storage capacity of at least 6 weight %;
    b) absorption kinetics such that the alloy powder absorbs 80% of it's total capacity within 5 minutes at 300° C.; and
    c) a cycle life of at least 650 cycles without loss of either capacity or kinetics.

2. The hydrogen powered vehicle system of claim 1, where said source of heat includes a fuel combustor for providing heat to said hydrogen storage bed, and a secondary fuel for said combustor.

3. The hydrogen powered vehicle system of claim 2, where said secondary fuel is selected from the group consisting of gasoline, fuel oil, propane, diesel fuel, or natural gas.

4. The hydrogen powered vehicle system of claim 3, where said secondary fuel is propane.

5. The hydrogen powered vehicle system of claim 2, where said combustor is selected from the group consisting of flame based burners, internal combustion engines, or catalytic combustors.

6. The hydrogen powered vehicle system of claim 5, where said combustor is a catalytic combustor.

7. The hydrogen powered vehicle system of claim 1, where said alloy has a cycle life of at least 1000 cycles without loss of either capacity or kinetics.

8. The hydrogen powered vehicle system of claim 1, where said alloy has a cycle life of at least 2000 cycles without loss of either capacity or kinetics.

9. The hydrogen powered vehicle system of claim 1, wherein said hydrogen storage alloy is formed from a powder which has a particle size range of between 30 and 70 microns.

10. The hydrogen powered vehicle system of claim 1, wherein said alloy includes at least 90 weight % magnesium.

11. The hydrogen powered vehicle system of claim 10, wherein said alloy further includes 0.5–2.5 weight % nickel.

12. The hydrogen powered vehicle system of claim 11, wherein said alloy further includes 1.0–4.0 weight % Misch metal.

13. The hydrogen powered vehicle system of claim 12, wherein said Misch metal comprises predominantly Ce, La and Pr.

14. The hydrogen powered vehicle system of claim 13, wherein said alloy further includes one or more from the group consisting of 3–7 weight % Al, 0.1–1.5 weight % Y and 0.3–1.5 weight % silicon.

15. The hydrogen powered vehicle system of claim 10, wherein said alloy comprises 91.0 wt. % Mg, 0.9 wt. % Ni, 5.6 wt. % Al, 0.5 wt. % Y and 2.0 at % Misch metal.

16. The hydrogen powered vehicle system of claim 10, wherein said alloy comprises 95.6 wt. % Mg, 1.6 wt. % Ni, 0.8 wt. % Si and 2.0 wt % Misch metal.

17. The hydrogen powered vehicle system of claim 10, wherein said alloy comprises 95 wt. % Mg, 2 wt. % Ni and 3.0 wt % Misch metal.

18. The hydrogen powered vehicle system of claim 10, wherein said alloy further includes at least one of carbon and boron.

19. The hydrogen powered vehicle system of claim 10, wherein said alloy has atomic scale porosity.

20. The hydrogen powered vehicle system of claim 1, wherein said alloy has a hydrogen storage capacity of at least 6.5 weight %.

21. The hydrogen powered vehicle system of claim 1, wherein said alloy has a hydrogen storage capacity of at least 7 weight %.

22. The hydrogen powered vehicle system of claim 1, wherein said alloy has absorption kinetics such that the alloy powder absorbs 80% of it's total capacity within 1.5 minutes at 300° C.

23. The hydrogen powered vehicle system of claim 1, where said source of heat includes a fuel combustor for providing heat to said hydrogen storage bed, and a secondary fuel for said combustor.

* * * * *